Patented Mar. 20, 1945

2,372,160

UNITED STATES PATENT OFFICE 2,372,160

SULPHURIZED ESTERS OF CYCLIC SULPHONES

Rupert C. Morris and John L. Van Winkle, Berkeley, Calif., assignors to Shell Development Company, San Francisco, Calif., a corporation of Delaware No Drawing. Application July 27, 1943, Serial No. 496,364

5 Claims. (Cl. 260—128)

This invention relates to a novel and particularly useful class of compounds, and more particularly pertains to sulphurized derivatives of unsaturated esters of cyclic sulphones. Specifically, the invention is directed to the reaction products formed by the addition of sulphur to sulpholanes and sulpholenes having at least one unsaturated acyloxy radical attached to a nuclear carbon atom of the sulpholane or sulpholene ring.

The term "sulpholene," as employed herein and in the appended claims, refers to an unsaturated structure containing four carbon atoms, a single olefin linkage between any two adjoining carbon atoms, and a sulphur atom in a ring, the sulphur atom of this five-membered heterocyclic unsaturated ring having two oxygen atoms attached thereto. This compound has also been called "thiacyclopentene-1,1-dioxide." Similarly, the term "sulpholane," as employed herein and in the appended claims, refers to a saturated sulpholene. In other words, the sulpholane contains or consists of a saturated five-membered ring of four carbon atoms and a sulphur atom, which latter has two oxygen atoms attached thereto. The general structural formula of the simple unsubstituted sulpholane, therefore, is:

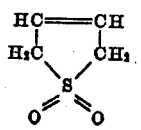

This compound has also been termed "thiacyclopentane-1,1-dioxide," "thiolane-1,1-dioxide," "cyclotetramethylene sulphone" or "dihydro butadiene sulphone." Generically, the term "sulpholane" covers not only the above compound, but also the substituted derivatives of this compound.

The double bond in the sulpholenes may be between any two of the adjacent carbon atoms of the ring, the generic term "sulpholene" covering both the simple, unsubstituted sulpholenes, i. e. the 3-sulpholene having the structure:

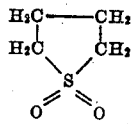

and the 2-sulpholene having the structure:

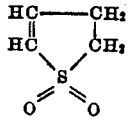

as well as the various derivatives thereof, i. e. sulpholenes in which various organic and/or inorganic radicals are substituted for one or more of the hydrogen atoms of the above structure.

The term "sulpholanol" refers to the hydroxy derivative of a sulpholane, i. e. compounds in which at least one hydroxyl (OH) radical is attached directly to a nuclear carbon atom of the sulpholane ring. Similarly, the term "sulpholenol" denotes the alcohols of the sulpholenes, and therefore covers compounds wherein the hydroxyl radical is directly attached to a nuclear carbon atom of the sulpholene ring.

It is an object of the present invention to provide a new class of chemical compounds. A further object is to provide a novel class of compounds possessing unexpectedly useful properties. Still other objects will be apparent from the description of the invention.

Broadly, the novel compounds of the present invention comprise the reaction products formed by the addition of sulphur to substituted and unsubstituted sulpholanes and sulpholenes containing at least one unsaturated acyloxy radical directly attached to a carbon atom of the sulpholane or sulpholene ring. In other words, the novel compounds of the present invention consist of the sulphurized derivatives of the unsaturated carboxylic esters of sulpholanols and sulpholenols.

The unsaturated carboxylic esters suitable for the preparation of the novel class of sulphurized derivatives of the present invention are disclosed and claimed in the co-pending application of Theodore W. Evans, Rupert C. Morris and Edward C. Shokal, Serial No. 495,376, filed July 19, 1943. As disclosed therein, these unsaturated esters of sulpholanols and sulpholenols all contain an unsaturated acyloxy radical directly attached to a nuclear carbon atom, the term "acyloxy radical" referring to a radical having the general formula

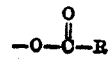

wherein R is an unsaturated organic radical, preferably an unsaturated hydrocarbon radical. In the case of unsaturated sulpholanyl esters, i. e. the unsaturated esters of sulpholanols, the compounds employed for the production of the novel sulphurized derivatives thereof may be represented by the general structural formula

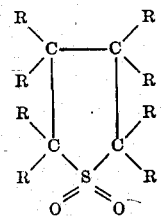

wherein at least one of the R radicals attached to a nuclear carbon atom is an unsaturated acyloxy radical, while the other R radicals (attached to the nuclear carbon atoms) are each a member of the group consisting of the hydrogen atom, a halogen atom, the hydroxyl radical, and an organic radical, preferably a hydrocarbon radical, such as an alkyl, alkenyl, cycloalkyl, cycloalkenyl, aryl, aralkyl or alkyaryl group. Similarly, in the case of the unsaturated sulpholenyl esters which are employed as a starting material for the production of the corresponding novel sulphurized derivatives, the general structural formula is substantially the same as presented above with the exception that the ring contains a double bond between two adjacent carbon atoms of the ring structure.

A preferred subgroup of the unsaturated esters which may be sulphurized to form a preferred subclass of novel sulphurized derivatives comprises the sulpholanes and sulpholenes in which a single unsaturated acyloxy radical is attached to the ring carbon atom in the 3-position, the remaining free bonds of the nuclear carbon atoms being taken up by hydrogen atoms, halogen atoms, hydroxyl radicals and/or saturated aliphatic radicals. As far as the sulpholane derivatives are concerned, this subgroup is represented by the following general structural formula

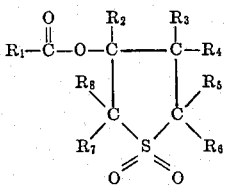

wherein $R_1$ designates an unsaturated organic radical (preferably an alkenyl radical), and wherein $R_2$ through $R_8$ are each a member of the group consisting of the hydrogen atom, a halogen atom, the hydroxyl radical, and an organic radical, preferably a hydrocarbon radical.

The unsaturated ester compounds, which may be sulphurized to produce the novel class of sulphurized derivatives, may in turn be prepared either by an esterification reaction between an unsaturated carboxylic acid and a cyclic sulphone containing a hydroxyl radical directly attached to a nuclear carbon atom or by the hereinbelow described ester exchange reaction. As examples of the hydroxylated cyclic sulphones which may be esterified, reference is made to 3-sulpholanol (3-hydroxy-sulpholane) and 3-sulpholenol (3-hydroxy-2-sulpholene), as well as to the various sulpholanols and sulpholenols which contain various substituents, and particularly alkyl radicals, attached to the various nuclear carbon atoms, e. g. 3-methyl-3-sulpholanol, 2-ethyl-3-sulpholanol, and the like, and their homologues and analogues. The unsaturated carboxylic acids which may be employed as one of the reactants in the production of the aforementioned unsaturated esters are characterized by possessing a carboxylic group linked to an organic substituent containing at least one unsaturated linkage between two carbon atoms of aliphatic character. The following are examples of such unsaturated carboxylic acids: acrylic acid, crotonic acid, isocrotonic acid, alpha methyl acrylic acid, vinyl acetic acid, beta ethyl acrylic acid, beta-beta dimethyl acrylic acid, beta pentenoic acid, allyl acetic acid, angelic acid, tiglic acid, hydrosorbic acid, sorbic acid, teracrylic acid, myristolenic acid, oleic acid, linoleic acid, linolenic acid, chloracrylic acids, chlorocrotonic acids, maleic acid, fumaric acid, citraconic, mesaconic, itaconic and glutaconic acids, and the like, and their homologues, analogues and suitable substitution products. The generic group containing the above-listed unsaturated carboxylic acids is intended to include all carboxylic acids containing one or a plurality of unsaturated bonds between two carbon atoms of aliphatic character and one or more carboxyl groups.

As brought out more specifically in the above-mentioned co-pending application Serial No. 495,376, the esterification reaction resulting in the formation of the unsaturated esters of the sulpholanols and sulpholenols may be executed in the presence or absence of various acid or acid-acting catalysts, and may be executed in a variety of different manners, e. g. by heating the unsaturated carboxylic acid in contact with the sulpholanol or sulpholenol, this heating being preferably realized at or about the boiling temperature of the reaction mixture under atmospheric pressure. Also, it was brought out that the unsaturated esters which are employed as the starting material or intermediates in the production of the novel class of sulphurized derivatives may be prepared by reacting a single mono- or poly-hydroxylated sulpholane or sulpholene with a single unsaturated carboxylic acid, or by employing different hydroxylated cyclic sulphones with a specific unsaturated carboxylic acid, or again by using a single hydroxylated cyclic sulphone and a mixture of different species of unsaturated carboxylic acids.

The ester exchange process of producing the above outlined unsaturated esters is effected, for example, by an interaction between an alkyl ester, e. g. methyl oleate, and a hydroxylated cyclic sulphone such as 3-sulpholanol or 3-sulpholenol, under such conditions of operation that the desired unsaturated ester, e. g. 3-sulpholanyl oleate or 3-sulpholenyl oleate, is formed with the concurrent formation of an alkyl alcohol, such as methanol, which latter may be distilled off or otherwise removed from the reaction zone.

The following is a specific example of one method of forming the unsaturated esters which may then be sulphurized in accordance with the process of the present invention to form the novel and useful sulphurized derivatives:

Approximately 265 grams (1.95 mols) of 3-sulpholanol were mixed with about 564 grams (1.99 mols) of oleic acid, 25 grams of concentrated sulphuric acid, and about 350 grams of benzene. The mixture was then subjected to distillation with refluxing, the water being removed by means of a separating still-head. After removal of all of the water (which was produced as the result of the esterification reaction), the remaining reaction mixture was neutralized, washed with water, and then carefully fractionally distilled. The distillate boiling between about 180° C. and 200° C. at one mm. mercury pressure was then separated and allowed to solidify. It was then recrystallized from methyl alcohol and was found to have a melting point of 49.5° C. to 50° C. This product had a boiling point of 370° C. at atmospheric pressure, and a boiling point of about 188° C. at 5 mm. mercury pressure. An analysis of this product showed that its composition was as follows:

|  | Calculated | Found |
|---|---|---|
| Percent carbon | 66.0 | 65.7 |
| Percent hydrogen | 10.0 | 10.1 |
| Percent sulphur | 8.00 | 7.98 |
| Eq./100 gr | 0.250 | 0.252 |

The above and other analyses showed that the reaction product consisted of the oleic acid ester of 3-sulpholanol, i. e., 3-sulpholanyl oleate.

The novel sulphurized esters of the sulpholanols and/or sulpholenols may be prepared by reacting the aforesaid unsaturated esters with sulphur, preferably at an elevated temperature and for a period of time sufficient to effect the desired addition of the sulphur to the unsaturated linkage or linkages of the unsaturated radical attached to the sulphone ring. Although there is no intention of being limited by any theory of the case, it is believed that the sulphur attaches itself at said unsaturated linkage to form an olefin sulphide radical

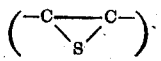

Obviously, when the unsaturated acyloxy radical attached to the sulphone ring contains more than one unsaturated linkage, it is possible to add the sulphur in an amount sufficient to satisfy all of these bonds or only a part of these olefinic or acetylenic linkages. This may be effected by controlling the amount of sulphur added as well as by regulating the reaction period and/or the temperature employed. Also, when the unsaturated sulpholanyl or sulpholenyl esters contain other unsaturated radicals attached to the sulphone ring, the reaction with sulphur may result in the addition of sulphur to one or more of the double bonds of such unsaturated radicals, the amount of sulphur thus added being controlled in the manner described hereinabove.

The following is an example of one illustrative embodiment of a method for the preparation of the novel products resulting from the sulphurization of unsaturated esters of sulpholanols and sulpholenols, it being understood that there is no intention of being limited to any specific proportions or conditions described.

A mixture of sulphur and 3-sulpholanyl oleate, employed in equimolal amounts, was heated in an atmosphere of nitrogen for a period of about 18 hours at a temperature which varied between about 166° C. and about 172° C. The reaction product was then taken up in a hydrocarbon fraction predominating in octanes, to remove any unreacted sulphur. After separation of the solution, the octanes were evaporated, thus leaving a reaction product comprising the product of sulphurization of the 3-sulpholanyl oleate, which product is believed to have the following structural formula:

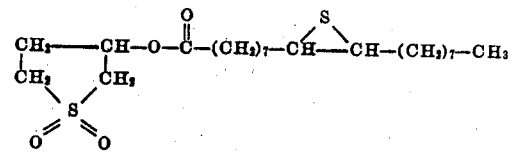

Although the novel sulphurized products of the present invention, which products, as stated, are formed by the sulphurization of the above described class of unsaturated esters of sulpholanols and sulpholenols, find utility in a large variety of industries, these compounds have been found to be particularly suitable as addition agents to lubricating oils and greases to reduce corrosive and/or abrasive wearing, scuffing, etc. Generally, when added to lubricating oils to improve wear resistance, the amounts required normally vary from about 0.1% to about 10%, preferably 0.5% to 5%, depending upon the conditions to be met. If complete solubility of the addition agent is required, its solubility limit in the lubricating oil frequently sets the upper limit of the amount which can be safely incorporated. However, complete solubility of the addition agent is not always essential. For example, compounds having extreme pressure properties may merely be suspended in lubricating oils and yet be effective. Also, sulphurized products of the above class which are substantially insoluble or only slightly soluble in oils may be useful in greases, such as soda soap greases, calcium soap greases, aluminum soap greases, petrolatum greases, etc., with which these addition agents may form substantially stable plastic mixtures.

The advantages derived from employing the above-described sulphurized esters of sulpholanols and sulpholenols as addition agents in lubricating oils and greases may be seen from the following examples:

*Example I*

A sample of a western lubricating oil, S. A. E. 30 grade, was divided into two portions. One of these portions was then mixed with about 1.3% by weight of the above-described product of sulphurization of 3-sulpholanyl oleate. Both the undoped and doped oils were then tested by a test known as the thrust bearing corrosion test. This test is carried out in the following manner: A hardened steel disc is made to rotate at a rate of 2400 R. P. M. for 20 hours under constant pressure of 125 lbs. per sq. in. against three flat copper-lead bearings. The bearing assembly rests in a steel cup filled with the oil to be tested. The temperature of the oil is maintained at a predetermined figure (170° C.) by thermostatic control. The bearings are weighed before and after the test, the difference in weight representing the loss sustained during the test. The results of these tests were as follows:

| Addition agent | Bearing wt. loss in mg./sq. cm. |
|---|---|
| None | 26.0 |
| 1.3% sulphurized 3-sulpholanyl oleate | 13.2 |

*Example II*

In order to determine the wear reducing properties of the novel sulphurized esters of the sulpholanols and sulpholenols, a sample of white oil was divided into two parts. The aforementioned sulfurized 3-sulfolanyl oleate was dissolved in an amount of about 0.05% by weight in one portion of said oil. The doped and undoped oils were then tested on a multiple four-ball machine similar in principle to the Boerlage apparatus described in the magazine "Engineering," vol. 136, July 14, 1933, to determine the ability of said oils to prevent metal wear. Generally described, this apparatus comprises four steel balls arranged in pyramid formation, the top ball being rotated by a spindle against the three bottom balls which latter are clamped in a stationary ball holder. The balls are immersed in the oil to be tested. The tests were run for a period of 2 hours at a temperature of 137° C., at 700 R. P. M., and under a vertical load of 7 kilograms. The diameters of the wear scars worn on the three balls forming the base of the pyramid were measured and the average taken as the true indication of wear. The results thus obtained were as follows:

| Addition agent | Scar diameter |
|---|---|
|  | Mm. |
| None | 0.70 |
| Sulphurized 3-sulpholanyl oleate | 0.29 |

We claim as our invention:
1. Sulphurized 3-sulpholanyl oleate.
2. A sulphurized ester of 3-sulpholanol and an unsaturated carboxylic acid.
3. A sulphurized ester of a sulpholanol and an unsaturated carboxylic acid.
4. A sulphurized ester of an unsaturated carboxylic acid and a sulpholanol wherein at least one of the hydrogen atoms linked to a carbon atom in the ring has been replaced by an alkyl radical.
5. A sulphurized ester of an unsaturated carboxylic acid and a sulpholanol wherein the nuclear carbon atoms are directly attached to members of the group consisting of the hydrogen atom and hydrocarbon radicals.

RUPERT C. MORRIS.
JOHN L. VAN WINKLE.